United States Patent
Ruffin et al.

(10) Patent No.: US 6,668,482 B1
(45) Date of Patent: Dec. 30, 2003

(54) FISH LURE WITH FLUID ATTRACTANT DISPENSER

(75) Inventors: Marshall V. Ruffin, Oak Grove, LA (US); Mabry M. McFarlin, Swartz, LA (US)

(73) Assignee: Louisiana Bucks Unlimited, Inc., Monroe, LA (US)

( * ) Notice: Subject to any disclaimer, the term of this patent is extended or adjusted under 35 U.S.C. 154(b) by 0 days.

(21) Appl. No.: 09/607,955

(22) Filed: Jun. 30, 2000

(51) Int. Cl.[7] .............................................. A01K 85/00
(52) U.S. Cl. ..................................................... 43/42.06
(58) Field of Search ........................... 43/42.06, 42.24, 43/42.26, 42.28, 42.13

(56) References Cited

U.S. PATENT DOCUMENTS

| | | | | |
|---|---|---|---|---|
| 2,091,457 A | * | 8/1937 | Sauer | 43/42.06 |
| 2,171,372 A | | 8/1939 | Peck | 43/46 |
| 2,674,058 A | | 4/1954 | Lindenberg | 43/42.06 |
| 2,791,058 A | | 5/1957 | Bettini | 43/42.06 |
| 2,836,001 A | * | 5/1958 | Silen | 43/42.06 |
| 2,968,886 A | * | 1/1961 | Cotroumpas | 43/42.06 |
| 3,066,434 A | * | 12/1962 | Duller | 43/42.06 |
| 3,654,724 A | | 4/1972 | Charron | 43/42.06 |
| 3,688,430 A | | 9/1972 | Balch | 43/42.06 |
| 3,969,840 A | * | 7/1976 | Charron | 43/42.06 |
| 3,971,152 A | | 7/1976 | Husson, Jr. | 43/42.06 |
| 3,987,575 A | | 10/1976 | Morita | 43/42.06 |
| 4,205,476 A | * | 6/1980 | Hsu | 43/42.06 |
| 4,267,658 A | * | 5/1981 | Brown et al. | 43/42.06 |
| 4,554,756 A | * | 11/1985 | Thomas | 43/44.99 |
| 4,610,103 A | * | 9/1986 | Steinman | 43/17.6 |
| 4,709,499 A | * | 12/1987 | Ottaviano | 43/17.6 |
| 4,777,757 A | | 10/1988 | de Marees van Swinderen | 43/41 |
| 4,839,983 A | * | 6/1989 | Pippert | 43/42.06 |
| 5,018,297 A | * | 5/1991 | Kennedy, Jr. | 43/42.28 |
| 5,155,947 A | | 10/1992 | Rivard | 43/42.06 |
| 5,172,510 A | * | 12/1992 | Lovell, Jr. | 43/42.36 |
| 5,444,935 A | * | 8/1995 | Pahle | 43/42.06 |
| 5,517,782 A | * | 5/1996 | Link et al. | 43/42.31 |
| 5,581,933 A | | 12/1996 | Bommarito | 43/42.06 |
| 6,039,488 A | | 3/2000 | Krawczyk et al. | 401/132 |

* cited by examiner

Primary Examiner—Kurt Rowan
(74) Attorney, Agent, or Firm—Jacobson Holman PLLC

(57) ABSTRACT

Lures for fish or other sea life having a single dose fluid attractant dispenser associated therewith which includes a generally cylindrical flexible container, preferably constructed of plastic material, and a breakable ampule, preferably constructed of glass, containing a quantity of fluid attractant positioned within the container. One end of the container is provided with a porous plug forming a wick for the fluid attractant when the breakable ampule within the container is broken by squeezing and deforming the container sufficiently to break the ampule. The fishing lure includes a body of any configuration normally used in fishing lures and a structure enabling the dispenser to be supported by the lure. In some embodiments, the fish lure body includes a cavity extending longitudinally into the body from a rearward end thereof to enable insertion of the dispenser. In other embodiments, the dispenser is attached externally of the lure.

1 Claim, 2 Drawing Sheets

FISH LURE WITH FLUID ATTRACTANT DISPENSER

BACKGROUND OF THE INVENTION

1. Field of the Invention

The present invention generally relates to lures for fish or other sea life. More specifically, the present invention relates to fish lures which have a unique attractant dispenser supported by the lure body to dispense a desired liquid attractant into the water when the lure is used to enhance the likelihood that a fish or other sea or aquatic life will "take the bait".

2. Description of the Prior Art

Various types of lures, bait and the like have been used by fishermen in order to catch fish or other sea life which occupy various bodies of water. Lures are attached to a fishing line and positioned at desired locations in the water at a fixed stationary location or moved in a desired pattern in order to entice the fish to "take the bait". Since it has been recognized that fish and other aquatic life are attracted to their food by the scent of the food, scent material has also been developed and associated with fish lures or fish hooks in order to attract fish or other sea life to the vicinity of the lures or hooks. It has been the practice, in some instances, to apply the attractant directly to the external surface of fish lure bodies, hooks or other fishing gear. One procedure which has been used extensively is providing a fluid or liquid attractant in a manually operated spray container or a pressurized spray container in order to apply the attractant to the fish lure or hooks. This procedure is time consuming, messy and requires the transportation of a bulky container in a tackle box and usually results in the attractant being deposited on the hands or other areas of the person applying the attractant to the lure. Other lures have been provided with structural features to dispense attractant into the water in adjacent surrounding relation to a fishing lure.

The following U.S. patents relate to fishing lures with scent material associated therewith including structures to enable elimination of the spray containers or other large containers of scent material:

| | | |
|---|---|---|
| 2,171,372 | 3,688,430 | 4,777,757 |
| 2,674,058 | 3,971,152 | 5,155,947 |
| 2,791,058 | 3,987,575 | 5,581,933 |
| 3,654,725 | | |

While the above patents disclose various fishing lures having structures for dispensing scent into the water adjacent a fishing lure to attract fish to the vicinity of the lure, they do not disclose a breakable ampule containing a quantity of attractant scent material which is enclosed within a flexible container having a wick at an open end thereof to enable release of the attractant from the interior of the container into the water when the ampule has been broken by squeezing the outer container. Further, the prior art does not disclose alternative configurations of the lure, alternative liquid attractants and alternative associations of the flexible outer container and breakable ampule with the fishing lure as incorporated into the present invention.

SUMMARY OF THE INVENTION

The present invention comprises a lure for fish or other aquatic life embodying any of the many external configurations and constructions normally used in catching fish or other sea life together with a dispenser enabling an attractant material to be dispensed into the water adjacent the lure to more effectively attract fish or other sea life to the vicinity of the lure. In accordance with the present invention, the dispenser includes a generally cylindrical flexible container and a breakable ampule containing a quantity of liquid attractant, positioned within the flexible container. The flexible container is preferably constructed of a plastic material and the breakable ampule is preferably constructed of glass. The breakable ampule within the flexible container can be broken by squeezing and deforming the container sufficiently to break the ampule and release the liquid. One end of the container is open and provided with a porous plug forming a wick for the fluid attractant when it is released. A preferred dispenser container is disclosed in U.S. Patent No. 6,039,488, owned by the same assignee as the instant application.

The fishing lure can have a body of any desired design and construction for the particular fishing application and can include any of the configurations normally used in fishing lures. It also has structure enabling the dispenser to be supportingly associated with the lure. The liquid dispenser can also vary in size depending upon the size and configuration of the lure and the desired fish or other sea life being sought. Further, the lure and dispenser combination of the present invention can be used in sea water, fresh water or any other type of water, as desired by the user.

In one disclosed embodiment of the invention, the fish lure body includes a cavity extending longitudinally into the body from the rearward end to enable insertion and retention of the flexible container within the cavity. The cavity is sized to allow the cylindrical container of the dispenser to snugly fit in the cavity and be held therein during use. The open end of the container closed by the wick is exposed to the rear of the fish lure body in order to dispense the liquid attractant. The container is deformed and the breakable ampule broken with the container then being inserted into the cavity with the wick exposed at the rear of the fish lure body so that liquid attractant released from the breakable ampule into the container will be dispensed into the water adjacent the fishing lure for attracting fish or other aquatic life to the lure.

In another disclosed embodiment of the invention, the container is supported externally of the lure with the porous wick again extending toward the rear of the lure so that liquid attractant discharged into the interior of the container when the breakable ampule is broken will be dispensed into the water adjacent the fishing lure. In accordance with the present invention, it is preferred that the container dispenser be supported on the lure body with the porous wick end extending towards the rear of the lure. In this manner, as the lure is pulled through the water, the water passing over the wick end aids in drawing the attractant fluid off the wick and into the water. It is also believed in so doing the wick is then able to draw the attractant fluid more rapidly out of the container during movement of the lure. On the other hand, when the lure is at rest in the water, the liquid attractant is dispensed off the wick at a much slower rate.

The shape, configuration and construction of the lure body may vary and the liquid attractant may also vary depending upon the type of fish or aquatic life sought and the type of water being fished. The purpose of the present invention is to provide a single dosage dispenser of a fish attractant which can be easily carried by the user to the point of use. The dispenser container can then be broken immediately before use to release the attractant. The dispenser is then assembled into or on the body of the lure which is specially designed to receive and support the dispenser in a desired manner and the dispenser is designed to provide a controlled release of the attractant when assembled on the lure body and the lure is placed in or moved through the body of water being fished. Thus, the present invention provides a lure to more efficiently lure various fish and other sea and aquatic life into the vicinity of the fishing lure and to more effectively lure the fish or other water life to "take the bait".

An object of the present invention is to provide a lure for fish or other sea life having a single dose attractant dispensing structure associated therewith.

It is a further object of the present invention to provide a fishing lure in accordance with the preceding object in which the dispensing structure includes an outer flexible container having an open end provided with a porous closure plug in the form of a wick exposed to the water surrounding the lure combined with a breakable ampule within the flexible container. The breakable ampule includes a quantity of attractant which is released into the flexible container when it is squeezed sufficiently to break the ampule thereby enabling attractant to be slowly dispensed through the wick into the water surrounding the lure thereby more effectively attracting fish or other sea life into the vicinity of the lure.

It is another object of the present invention to provide a lure having a body provided with an elongated cavity opening to a rearward portion of the body with the cavity, flexible container and ampule dispenser being compatible in size to enable the flexible container to be fittingly inserted into, and held within, the cavity with a porous plug wick exposed to the water at the rearward portion of the lure body.

A further object of the invention is to provide a lure having an attractant dispenser mounted externally of the lure body with the dispenser including a flexible container having an open end closed by a porous plug forming a wick with a breakable ampule positioned interiorly of the flexible container. When the ampule is broken by squeezing the outer container, the attractant in the ampule is discharged through the wick into water surrounding the lure.

A still further object of the invention is to provide a lure for fish or other sea life in accordance with the preceding objects in which the lure can include various configurations, shapes and structures including existing lures which can be modified to receive or support an attractant dispenser as set forth in the preceding objects.

Still another object of the invention is to provide a lure for fish or other aquatic life having an attractant dispenser associated therewith in which the attractant includes the scent of various baits normally used to attract fish or other aquatic life to the vicinity of the lure.

Yet another object of this invention to be specifically enumerated herein is to provide a fish lure with liquid attractant dispenser in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of constructions and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
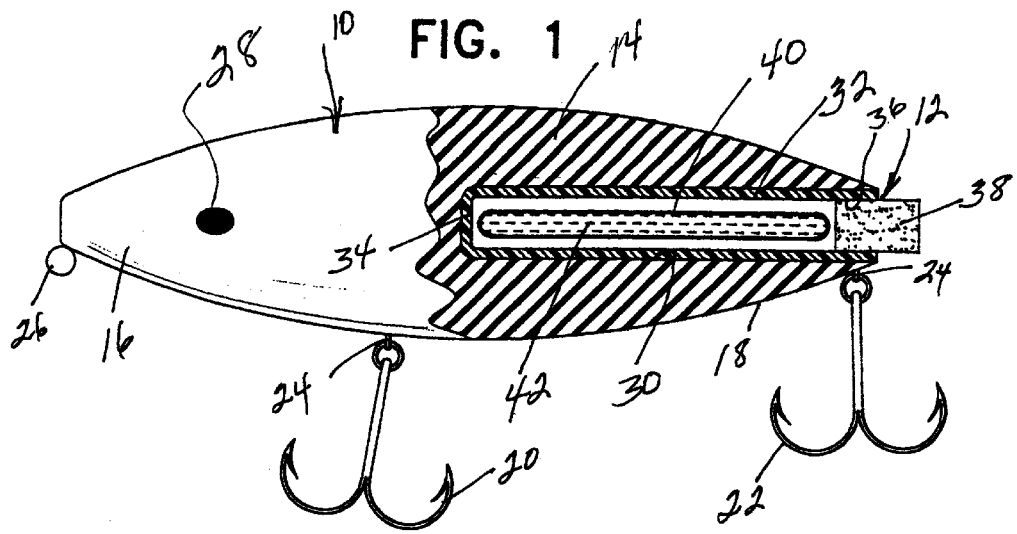
FIG. 1 is a side elevational view of a fish lure with a portion of the body broken away illustrating a longitudinal cavity therein open to the rear receiving an attractant dispenser within the lure body in accordance with the present invention.

Although several preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring specifically to FIG. 1, the lure in this embodiment of the invention is generally designated by reference numeral 10 and the attractant dispenser is generally designated by reference numeral 12. The lure 10 includes an elongated body 14 which may be circular or oval shaped in transverse configuration and which may taper at the forward end 16 and taper at the rearward end 18 with hooks or gang hooks 20 and 22 being supported along the bottom surface of the body 14 by eye supports 24. The lure body 14 includes an eye 26 at its forward end for attachment to a fishing line and may have other external markings such as eyes 28 to simulate a small bait fish used as a lure for various fish and sea life in a manner well known in this art.

The attractant dispenser 12 is positioned in a longitudinal cavity 30 formed in the body 14 and extending forwardly from the rearward tapered end 18 of the body. As illustrated in FIG. 1, the attractant dispenser 12 includes a generally cylindrical outer container 32 constructed of flexible material such as plastic or other liquid or fluid retaining material. A forward end of the container 32 is closed at 34 and the rearward end is open at 36. The open end 36 includes a porous closure plug 38 forming a wick which projects from the interior of the container to a short distance beyond the rearward end of the container 32.

Positioned within the flexible outer container 32 is a breakable ampule 40, preferably constructed of glass, containing a quantity of liquid attractant 42. The ampule 40 preferably has a periphery that is spaced from the interior surface of the container 32 so that normal handling and transportation of the container 32 with the ampule 40 therein will not result in breakage of the ampule 40. However, by squeezing the flexible container 32, the breakable ampule 40 can be broken for discharge of the attractant into the interior of the container 32. The attractant 42 will come into contact with the inner end of the wick 38 and migrate by capillary action to the rearward exposed end portion of the wick 38. The attractant will then be dispensed into the water in the area surrounding and adjacent to the wick and lure when the lure is placed in the body of water being fished. The cavity 30 is sized so that the container 32 will be retained in cavity 30 in the body 14 by frictional engagement which permits removal and replacement of the attractant dispenser 12 as desired by the user but will be retained in the body 14 during use in the water.

The attractant 42 is preferably a liquid and has a fragrance or scent similar to that emitted by various baits used in conjunction with conventional fish lures, hooks and the like. Although liquid is preferred as the attractant medium, it is possible that other attractant mediums could be used that can be dispensed from a broken ampule into the surrounding water. For example, the attractant could be in a solid form such as granules or pellets which dissolve or release the attractant when in water. When the ampule is broken and water is allowed to enter the flexible outer container, the attractant material dissolves and dispenses around the lure. Hence, it is not intended to limit the attractant solely to a liquid. Some of the scents of attractant which can be used in the present invention include but are not limited to shrimp, crayfish, mullet, chicken liver, squid, garlic, night crawler, beef blood, shad, minnow, crab and cheese. However, any fragrance or scent, imitation or natural, which is used to attract a fish or other sea life when baiting a fish lure or hooks, can be used in accordance with the present invention.

Figure 2:
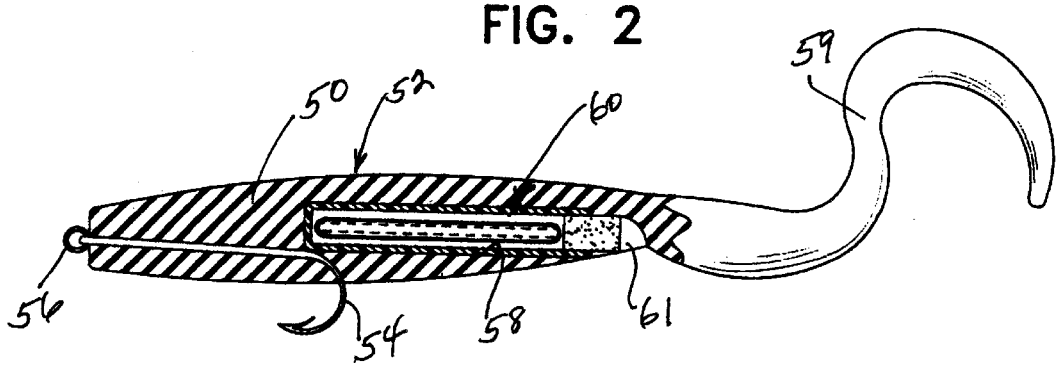
FIG. 2 is an elevational view of a plastic worm lure having a portion broken away illustrating the association of an attractant dispenser within the lure body in accordance with the present invention.

The fish lure 10 illustrated in FIG. 1 can be an existing fish lure in which the body is provided with a cavity as disclosed or it may be a specially constructed body having a rearwardly opening cavity. For example, FIG. 2 illustrates a fish lure body 50 forming a forward body end of a flexible plastic or elastomeric worm 52 having a hook 54 in the lower portion of the body 50 and a connecting eye 56 at the forward end. A cavity 58 is provided in a rearward portion of the body 50 with the cavity opening rearwardly to the exterior of the body 50. The cavity 58 receives an attractant dispenser 60 in the same manner as the dispenser 12 is assembled in body 14 in FIG. 1. The flexibility of the plastic worm enables the very flexible rearward end 59 to be deflected to enable the attractant dispenser 60 to be inserted into the open rearward end 61 of the cavity 58.

Figure 3:
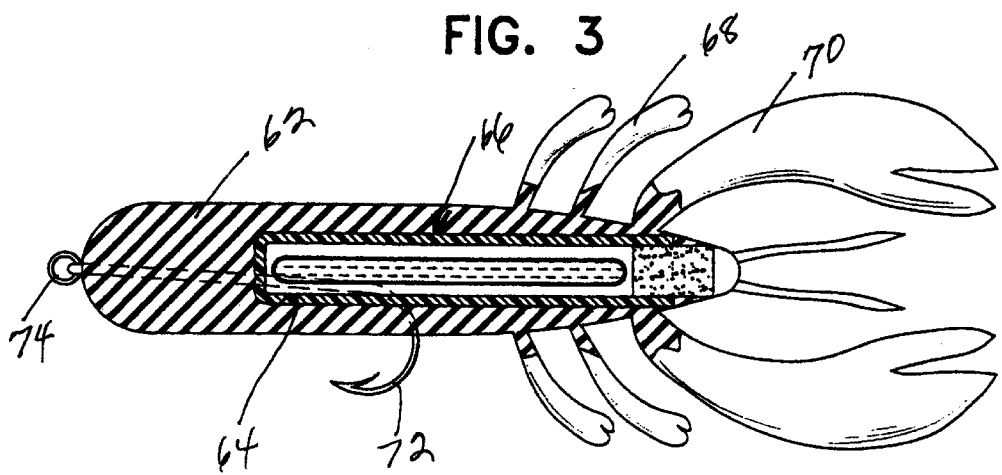
FIG. 3 is a top plan view of a lure simulative of a plastic crayfish or shrimp with a portion broken away illustrating the association of an attractant dispenser within the lure body in accordance with the present invention.

FIG. 3 illustrates a further example of the invention in which the body 62 is a plastic or elastomeric crayfish or shrimp and includes a cavity or compartment 64 opening to the rearward end for receiving an attractant dispenser 66 in the same manner as in FIG. 1. The body 62 includes laterally and rearwardly extending appendages 68 and 70 in order to simulate the crayfish or shrimp. The body 62 also includes a hook or hooks 72 (only one is illustrated) and an attaching eye 74 at the forward end thereof.

Figure 4:
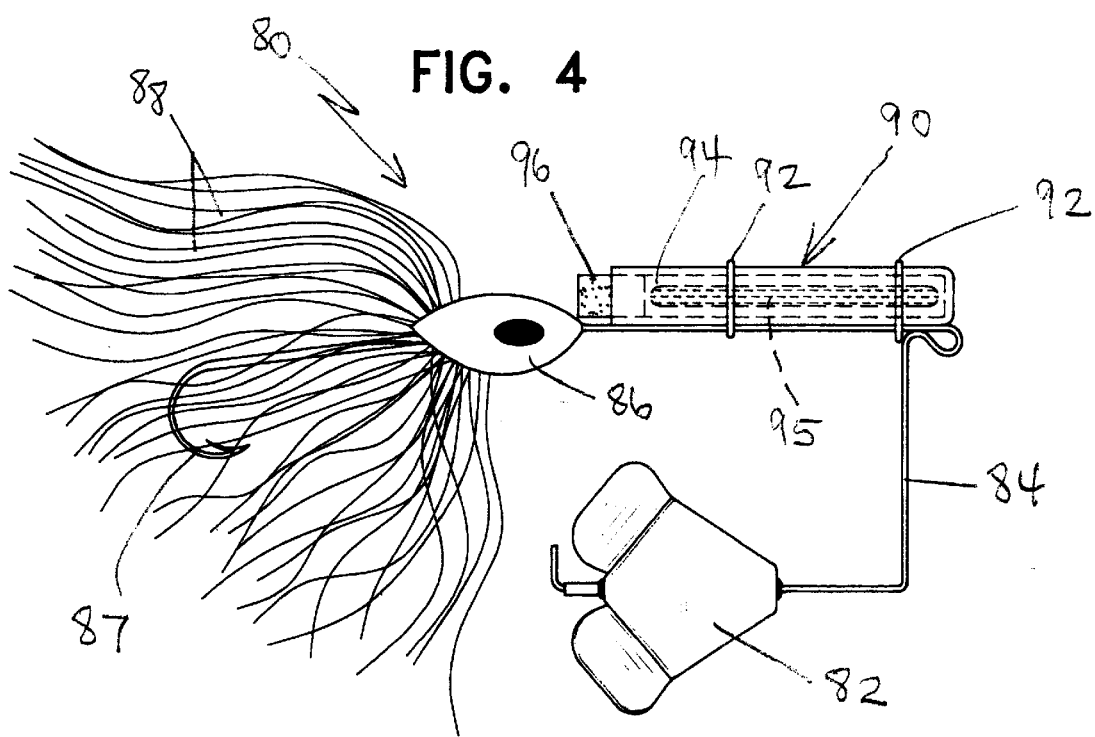
FIG. 4 is a side elevational view of a spinner lure having an attractant dispenser supported on the lure body in a "piggy back" manner in accordance with the present invention.

FIG. 4 illustrates another embodiment of the invention including a lure generally designated by reference numeral 80 which generally is referred to as a spinner lure and includes a shiny and reflective spinner 82 supported on a wire structure 84 extending from a body 86 and provided with a hook 87 and plurality of flexible hair-like appendages 88 associated therewith which represents a conventional spinner bait or lure. An attractant dispenser 90 is supported from the spinner lure 80, such as from wire structure 84, by metal rings or metal wire clips 92 engaging and supporting the attractant dispenser 90 in generally parallel relation to the longitudinal extent of the lure 80. The attractant dispenser 90 is the same as that illustrated in detail in FIG. 1 with the wire clips 92 supportingly engaging the exterior surface of the flexible container 94 of the attractant dispenser 90. The ampule 95 may be broken by squeezing the flexible container 94. Hence, in this example the ampule 95 can be broken after the container is assembled into rings 92 and just prior to casting the lure into the body of water being fished.

The porous wick 96 of the attractant dispenser 90 in this embodiment may be disposed either forwardly or rearwardly of the lure 80 and functions to discharge fluid or liquid attractant into the water surrounding and adjacent to the lure when the container 94 is squeezed to break the ampule in the container to effectively attract fish or other aquatic life to the vicinity of the lure. However, the wick 96 is preferably directed toward the rear of the lure as previously described.

The lure used in combination with the attractant dispenser according to the present invention may be a modified existing lure or may include any and all lures which can be modified or constructed to use the attractant dispenser. The lures can be fresh water lures, salt water lures, jigs, plastic worms, spinner lures, deep dive lures, shallow dive lures, surface water lures and is not limited to any specific type of fishing lure or fishing category or other sea or fresh water life. The attractant dispenser is positioned in a cavity in the lure body or attached to the external surface of any lure and can vary in size depending on the size or configuration of the lure and the fish or other aquatic life being fished.

When inserting the attractant dispenser into a cavity in the body of the lure, such as lure body 14 illustrated in FIG. 1, just prior to casting the lure into the water, the flexible container 32 of the attractant dispenser 12 is squeezed sufficiently hard to break the breakable ampule 40. The attractant dispenser 12 is then inserted into cavity 30 and the attractant liquid 42 discharges into the interior of the container 32 and into contact with the wick 38. The attractant is thus discharged into the water surrounding and adjacent to the lure. In the embodiments illustrated in FIGS. 2 and 3, the flexible containers of the attractant dispensers 60 and 66 can be squeezed to break the ampule prior to insertion into cavity 58 or 64 or after insertion into the cavities providing bodies 50 or 62 are sufficiently flexible and/or resilient. In the embodiment illustrated in FIG. 4 in which the attractant dispenser 90 is attached externally of the lure 80, the attractant dispenser 90 can be mounted on the lure at any time. Just prior to casting the lure 80 into the water, the flexible container 90 can be squeezed to break the breakable ampule 95 in order for the attractant to contact the wick 96 for discharge of the scent material into the water surrounding and adjacent to the lure 80.

Each embodiment of attractant dispenser is substantially the same as the scent dispenser and applicator disclosed in U.S. Pat. No. 6,039,488 owned by the same assignee of this application, except that closure cap 26 disclosed in that patent is not necessary in this invention. However, for ease in carrying the single dose attractant dispenser of the present invention prior to use, especially when packaged together with multiple dispensers, say in a package of ten or twenty, like cigarettes are packaged in a flip open box, it may be desirable to include the closure cap 26 in order to protect the wick until the dispenser is ready for use, or even protect the user in the event of accidental breakage of the breakable ampule. In such instances, the closure cap 26 is simply removed and thrown away prior to use of the dispenser. Furthermore, in those instances where it might be desirable to have the attractant fluid dispensed more slowly, a porous cap such as made from paper or lightweight cardboard materials may be desirable. In such circumstances, the cap tends to retard release of the attractant fluid from the wick to the water.

The use of the attractant dispenser in combination with the lure provides for effective use of fluid attractant by eliminating the use of large spray containers of liquid attractants and reduces the waste of the bait attractants which are normally sprayed onto or otherwise applied to the external surface of fishing lures. The single dose attractant dispenser can be mounted in various cavity arrangements in the fishing lure body or mounted on or supported from support structures externally of the lure body with the lure having any desired configuration and the attractant having any desired scent.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A lure for fish or other water life, when placed in a body of water, said lure comprising a body having an elongated cavity, said cavity having an open outward end and a single dose attractant dispenser supported in said cavity, said dispenser including a flexible elongated container having an open end and supported in said cavity, said cavity telescopically receiving and retaining said container, said container extending substantially throughout the length of said cavity with said open end of the container adjacent said outward open end of said cavity, a porous wick forming a closure plug for said open end of said container, said wick being positioned adjacent the open outward end of said cavity for contact with water when the lure is placed in a body of water, an ampule encased in said container, a quantity of flowable, liquid fish attractant in said ampule, said ampule being breakable and discharging said attractant into the interior of the container when the flexible container is squeezed to break the ampule for discharging attractant into the container and in contact with said wick, said wick enabling slow passage of attractant therethrough into the body of water in which the lure has been placed in a direction generally opposite to the direction of movement of said lure when moved through water; said container being constructed of flexible plastic material, said container being sized to be retained in said cavity by frictional engagement therewith to enable removal and replacement of said container, said cavity including a closed end remote from said open outward end, said container including a closed end remote from said open end thereof, said open end of said container being positioned adjacent said open end of said cavity when said container having said ampule therein is inserted into said cavity thereby positioning said porous wick in said open end of the container adjacent said open end of said cavity, said ampule being constructed of glass and having a periphery spaced from an interior surface of said container to protect the ampule from breakage during handling of said container, when inserting the container into said cavity and retaining all of said breakable ampule within said container when the ampule is broken.

* * * * *